United States Patent [19]

Brademeyer

[11] 4,213,655
[45] Jul. 22, 1980

[54] MASTER CYLINDER ASSEMBLY AND BRAKE SYSTEM INCORPORATING SAME

[75] Inventor: David L. Brademeyer, Dayton, Ohio

[73] Assignee: General Motors Corporation, Detroit, Mich.

[21] Appl. No.: 951,586

[22] Filed: Oct. 16, 1978

[51] Int. Cl.² ............................................. B60T 13/00
[52] U.S. Cl. ..................................... 303/6 C; 60/591; 188/349; 340/52 C
[58] Field of Search ......................... 303/6 C; 188/349; 340/52 C; 60/591

[56] References Cited

U.S. PATENT DOCUMENTS

| | | | |
|---|---|---|---|
| 3,695,730 | 10/1972 | Ayers | 303/6 C |
| 3,804,468 | 4/1974 | Ishikawa | 188/349 |
| 3,938,333 | 2/1976 | Mathues | 303/6 C |
| 3,964,795 | 6/1976 | Mathues | 303/6 C |
| 4,084,377 | 4/1978 | Gaiser | 340/52 C |

Primary Examiner—Trygve M. Blix
Assistant Examiner—Reinhard J. Eisenzopf
Attorney, Agent, or Firm—D. D. McGraw

[57] ABSTRACT

A dual master cylinder has modular proportioners attached to an outlet from each pressurizing chamber. The master cylinder is shown installed in an X-split vehicle brake system. The master cylinder assembly includes a pressure failure warning device. The arrangement provides a minimum number of leak points, permits the master cylinder and the modular proportioners to be built and tested separately, and enhances serviceability since the modular proportioners can be separately replaced without removing the master cylinder. It also permits the master cylinder to be of a universal type with modular proportioners of various proportioning characteristics used in accordance with the particular vehicle application.

5 Claims, 7 Drawing Figures

MASTER CYLINDER ASSEMBLY AND BRAKE SYSTEM INCORPORATING SAME

The invention relates to a brake system having a dual master cylinder with modular proportioners attached to each outlet. The modular proportioners are connected so that one proportioner serves each rear wheel brake. The system makes provision for connecting the front wheel brakes so that they are also supplied by pressurized fluid from different master cylinder pressurizing chambers. The preferred arrangement therefore has the front right wheel brake and the rear left wheel brake being pressurized by one master cylinder pressurizing chamber and the front left wheel brake and rear right wheel brake being pressurized by the other master cylinder pressurizing chamber.

It is a feature of the invention to provide a modular proportioner which is directly attached to a master cylinder outlet without the need for orientation of the proportioner at the time of initial assembly. It is less expensive to install a proportioner in this manner on a vehicle in comparison to separate proportioner housings previously used. The system requires no additional tubing or fittings from the master cylinder to the rear wheel to be controlled in comparison to a similar system without proportioners.

The invention as it relates to the master cylinder assembly provides for a universal assembly which can be installed in a location in a vehicle so that it is readily accessible for servicing the proportioners. For this purpose the outlets of the master cylinder pressurizing chambers to which the proportioners are attached may be so provided to yield such accessibility after the master cylinder assembly is installed in the vehicle. The arrangement also permits the use of any one of a plurality of proportioner assemblies having different proportioning characteristics so that the basic master cylinder assembly may be readily adapted for use on vehicles having different proportioning requirements.

It is also a feature of the invention to provide such a master cylinder assembly with modular proportioners and also to include pressure failure warning switch operating means in a master cylinder housing bore containing a shuttle piston arrangement sensitive to pressures generated in each of the master cylinder pressurizing chambers. The bore in which the switch operating means is positioned has its opposite ends respectively in fluid communication with output passages from one of the pressurizing chambers.

The invention permits the master cylinder and the modular proportioners to be built and tested separately before being put together to form the master cylinder assembly. It also enhances serviceability since the modular proportioners can be separately removed and replaced without removing the master cylinder from its installed position in the vehicle. Similarly, the failure warning switch actuating means and switch may be easily serviced.

IN THE DRAWINGS

Figure 1:
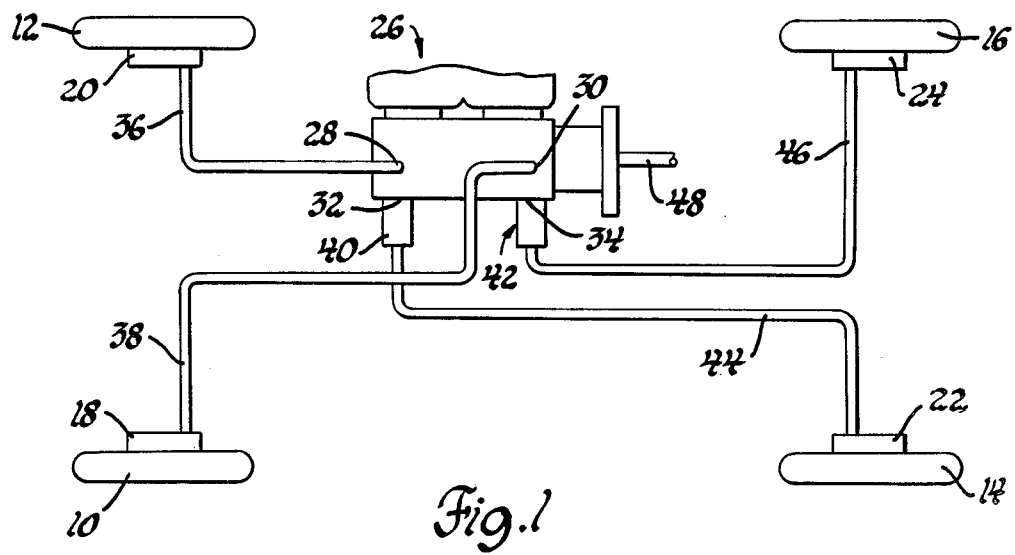
FIG. 1 is a schematic representation of a vehicle brake system embodying the invention.
Figure 2:
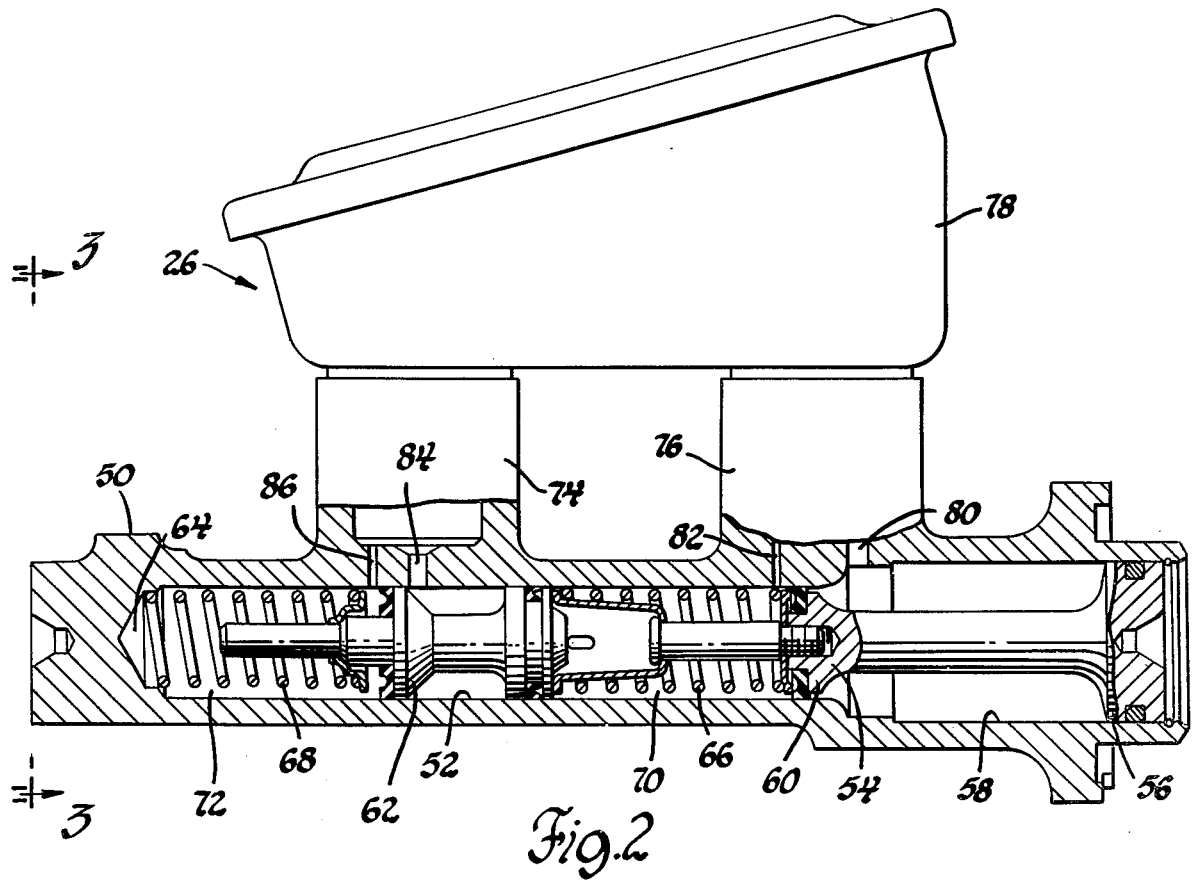
FIG. 2 is an elevation view of the master cylinder assembly of FIG. 1 with parts broken away and in section.

The vehicle in which the brake system schematically illustrated in FIG. 1 is installed has front left and right wheels 10 and 12 and rear left and right wheels 14 and 16. These wheels are respectively provided with wheel brake units 18, 20, 22 and 24. The system includes the master cylinder assembly 26 and appropriate conduits connecting that assembly to the wheel brake units. The particular system illustrated is a diagonally split system. The master cylinder assembly 26 is illustrated as having outlets 28 and 30 leading from separate master cylinder pressurizing chambers, and additional outlets 32 and 34 similarly leading from the separate pressurizing chambers. Conduit 36 connects outlet 28 to the front right wheel brake unit 20. Conduit 38 connects outlet 30 with the front left wheel brake unit 18. The master cylinder assembly 26 has modular proportioner assemblies 40 and 42 respectively installed in outlets 32 and 34. Conduit 44 connects the outlet of modular proportioner assembly 40 with the rear left wheel brake unit 22 and conduit 46 connects the outlet of modular proportioner assembly 42 with the rear right wheel brake unit 24. Thus the rear pressurizing chamber of the master cylinder assembly 26 is illustrated as providing pressurized brake fluid to the front left wheel brake unit 18 and the rear right wheel brake unit 24. Furthermore, the forward master cylinder pressurizing chamber similarly provides pressurized brake fluid to the front right wheel brake unit 20 and to the rear left wheel brake unit 22. The master cylinder input push rod 48 may be suitably actuated by the vehicle operator either manually or through an appropriate power brake booster unit.

The master cylinder assembly 26 is more particularly illustrated in FIGS. 2 through 7. It includes a master cylinder housing 50 in which is provided a master cylinder bore 52. A primary pressurizing piston 54 is reciprocably mounted in bore 52. The particular piston and master cylinder arrangement illustrated is of the quick take-up type such as that shown in U.S. Pat. application Ser. No. 927,857, entitled, "Quick Take-Up Master Cylinder", filed July 25, 1978 and assigned to the common assignee. It is to be understood that the invention may be used with other dual master cylinder assemblies. Examples of other such assemblies are found in U.S. Pat. Nos. 2,157,733-Sessions and 3,877,228-Shellhause.

It may also be used with master cylinder assemblies having more than two pressurizing chambers.

The primary pressurizing piston 54 has a rearward land 56 reciprocably movable in an enlarged section 58 of bore 52, and a smaller forward land 60 reciprocably movable in the smaller forward portion of bore 52. A secondary pressurizing piston 62 is reciprocably received in bore 52 intermediate piston 54 and the forward end 64 of bore 52. Suitable piston return springs 66 and 68 are provided for pistons 54 and 62. Spring 66 is located in the primary pressurizing chamber 70, which is positioned axially between the forward end of piston 54 and the rear end of piston 62. Spring 68 is located in the secondary pressurizing chamber 72, which is axially intermediate the forward end of piston 62 and the bore forward end 64. Suitable pressurizing chamber outlets, not shown in FIG. 2 but shown in FIGS. 5 and 6 and described in greater detail below, are provided.

The master cylinder housing 50 has reservoir mounting bosses 74 and 76 extending upwardly therefrom. A master cylinder reservoir 78 is illustrated as being mounted on bosses 74 and 76 in a manner much the same as that disclosed in the above noted application. Rear compensation ports 80 and 82 provide fluid communication between reservoir 78 and certain portions of bore 52. The details of such communication may be comparable to those in the above noted application, by way of example. Forward compensation ports 84 and 86 provide fluid communication through boss 74 with reservoir 78 and bore 52 as also described in greater detail in the above noted application.

Figure 3:
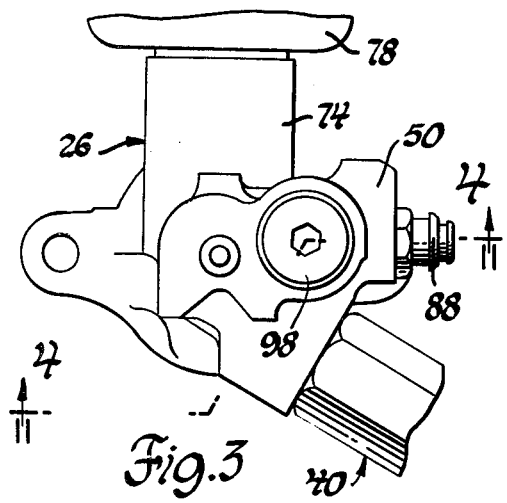
FIG. 3 is an end view of the master cylinder assembly of FIG. 2 taken in the direction of arrows 3—3 of that figure and having parts broken away.
Figure 4:
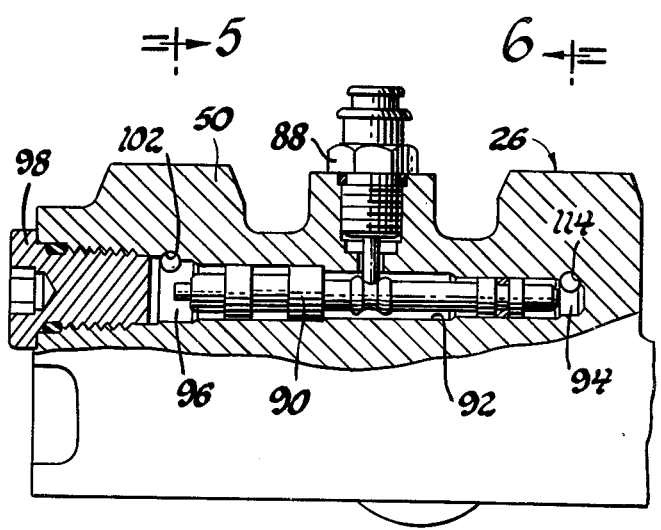
FIG. 4 is a fragmentary cross section view of a portion of the master cylinder assembly taken in the direction of arrows 4—4 of FIG. 3 and particularly illustrating the failure warning switch operating means.

The end view of the master cylinder assembly 26 illustrated in FIG. 3 is at the forward end of the assembly. The portion of the housing 50 having bore 52 formed therein is immediately beneath boss 74. The pressure failure warning switch 88 is illustrated as extending laterally and generally horizontally from the assembly housing. The switch operating means 90, shown in FIG. 4, is positioned within a bore 92 formed in a portion of housing 50 so as to be laterally offset from bore 52. It is preferred that bore 92 be axially parallel to bore 52 so that various machining operations may be accommodated. The switch operating means 90 is a shuttle piston and may be any of several types. Examples are found in U.S. Pat. Nos. 3,727,991-DeHoff et al and 3,733,106-Rike et al. The bore 92 has closed bore ends 94 and 96. A plug 98 closes bore 96 and is removable to permit servicing the shuttle piston 90. The failure warning switch 88 is suitably positioned so that axial movement of the shuttle piston 90 due to loss of pressure in one bore end but not the other will actuate the switch and close a circuit containing a warning device. Details of this type of arrangement are well known in the art.

Figure 5:
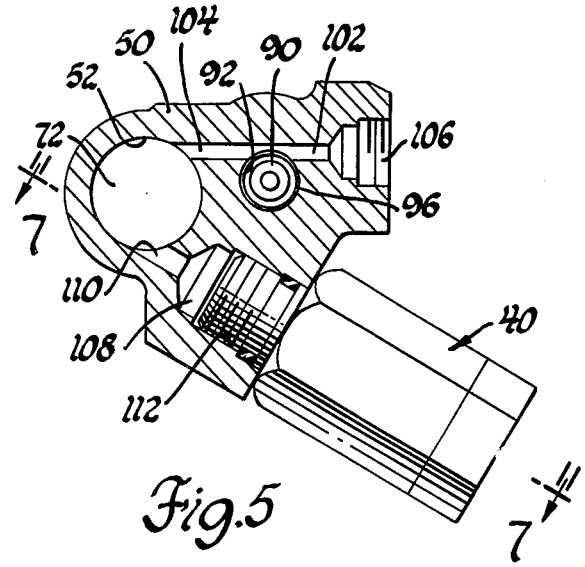
FIG. 5 is a cross section view of a portion of the master cylinder assembly of FIGS. 2-4 taken in the direction of arrows 5—5 of FIG. 4 and illustrating the passage means connected with one of the master cylinder assembly pressurizing chambers and a modular proportioner assembly in the assembled position.
Figure 6:
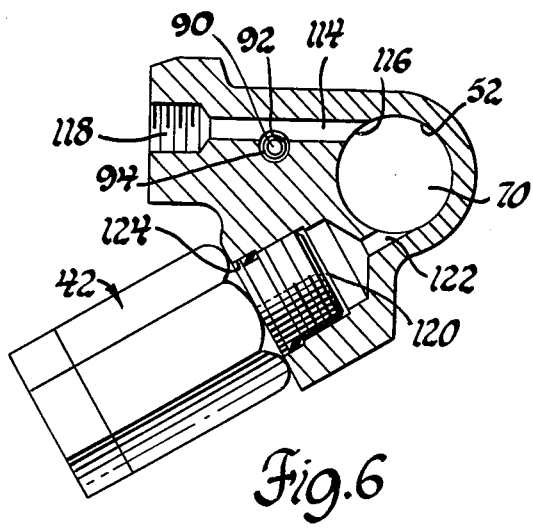
FIG. 6 is a cross section view of a portion of the master cylinder assembly of FIGS. 2-4 taken in the direction of arrows 6—6 of FIG. 4 and showing passage means communicating with the other pressurizing chamber of the master cylinder assembly and illustrating the other modular proportioner assembly in the installed position.

FIGS. 5 and 6 illustrate the outlet passage means from the master cylinder pressurizing chambers. FIG. 5 is a section view taken through a portion of the pressurizing chamber 72. An outlet passage 102 has an inlet end 104 communicating with chamber 72 and an outlet end 106 opening to the exterior of master cylinder housing 50. Passage end 106 forms outlet 28 as shown schematically in FIG. 1 with conduit 36 being attached thereto. Passage 102 also intersects the closed bore end 96 of bore 92 so that pressurized fluid from chamber 72 is capable of acting on one end of shuttle piston 90. Another outlet passage 108 is formed in housing 50 and has an inlet end 110 also opening into chamber 72. Passage 108 has an outlet end 112 opening to the exterior of housing 50 and providing outlet 32 as illustrated in FIG. 1. The modular proportioner assembly 40 is attached to the master cylinder housing at outlet end 112 by any suitable manner such as the threaded arrangement illustrated.

FIG. 6 is a cross section view taken through the primary pressurizing chamber 70 and appropriate outlet passages. The outlet passage 114 has an inlet end 116 in fluid communication with chamber 70, and an outlet end 118 opening to the exterior of housing 50 and defining outlet 30 of FIG. 1. Passage 114 intersects the closed end 94 of bore 92 so as to provide pressurized fluid acting on one end of shuttle piston 90. Another outlet passage 120 is provided in housing 50 and has its inlet end 122 in fluid communication with chamber 70. The outlet end 124 of passage 120 opens to the exterior of housing 50. The modular proportioner assembly 42 is secured in outlet end 124 in a manner similar to that of modular proportioner assembly 40 as above described.

Figure 7:
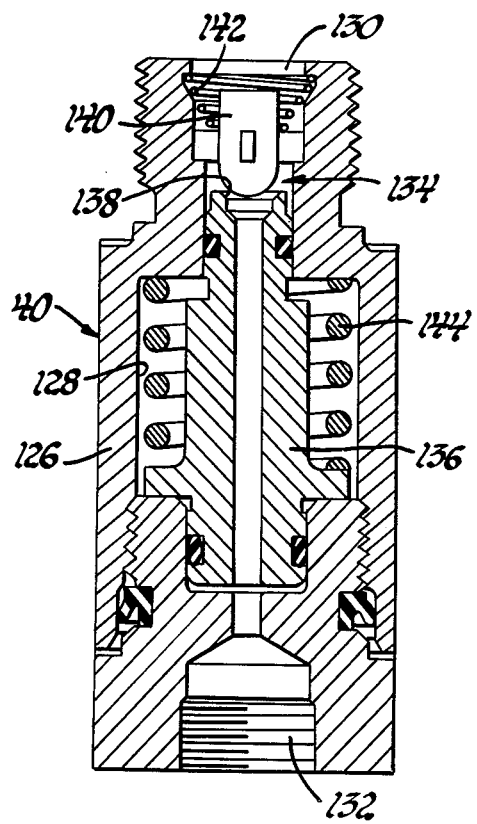
FIG. 7 is a cross section view of one of the modular proportioner assemblies, the view being taken in the direction of arrows 7—7 of FIG. 5.

Modular proportioner assembly 40 is illustrated in greater detail in FIG. 7. It is to be understood that modular proportioner assembly 42 is of a similar construction. The assembly includes a housing 126, preferably formed from bar stock such as a hexagonal bar so that the proportioner assembly may be readily removed and tightened as if it were a hexagonal nut or stud. A bore 128 extends axially through housing 126 and has an inlet 130 at one end and an outlet 132 at the other end. By having the inlet 130 and outlet 132 in axial alignment, no particular orientation of the modular proportioner assembly is required, and it may be tightened to desired specifications without concern as to angular orientation. A pressure proportioning valve means 134 is provided in bore 128. The valve means 134 includes a proportioning piston 136 having a valve seat 138, a valve member 140 cooperable with the valve seat to provide proportioning action, and suitable springs 142 and 144. The proportioning action may be similar to that shown and described in greater detail in U.S. Pat. No. 3,733,106-Rike et al, by way of example. The proportioning assemblies 40 and 42 may be designed to begin their proportioning actions at any of several desired brake actuating pressure points in accordance with the need as determined by vehicle characteristics as well as wheel brake unit characteristics. If a front-rear split system is utilized, only one modulating proportioning assembly may be required, that being the one connected to the rear brakes in the typical passenger vehicle as well as many light trucks.

What is claimed is:

1. A universal master cylinder assembly adapted for installation in a location easily accessible for servicing thereof, and having a housing having an axially extending body with an axially extending bore formed therein, a plurality of hydraulic fluid pressurizing pistons in said bore and defining in conjunction with said bore a plurality of hydraulic fluid pressurizing chambers, a plurality of bosses integrally formed as part of said housing and extending outwardly therefrom generally perpendicular to said housing body, a hydraulic fluid reservoir, inlet means in at least one of said bosses connecting said reservoir to said bore to provide hydraulic fluid to said pressurizing chambers and to receive hydraulic fluid from said pressurizing chambers under certain conditions, and outlet passage means extending through at least another one of said bosses and formed in said housing and including at least one outlet passage for each of said pressurizing chambers, each of said at least one outlet passages having one end opening into and communicating continuously with one of said pressurizing chambers and another end opening exteriorly of said housing boss through which said outlet passage extends, said another end circumferentially and radially oriented in said housing boss for easy access thereto when said housing is installed in said location, said another end being internally threaded to receive universally any one of a plurality of proportioner assembly means interchangeable in said housing to form said assembly irrespective of installation of said housing in said location;

at least one proportioner assembly means including an axially extending housing having a bore extending axially therethrough providing an inlet and an outlet at opposite bore ends, said housing having a plurality of circumferentially arranged and axially extending flat outer surfaces for receiving a tool such as a wrench, and also having one end with said inlet extended therethrough formed with external threads, said threaded one end of said proportioner assembly means housing extending and threaded into one of said outlet passages through said threaded another end thereof and being removably secured to said master cylinder assembly housing, said flat outer surfaces providing a purchase for a tool used in installation and removal of said proportioner assembly means, and pressure proportioning valve means in said proportioner housing bore intermediate said inlet and said outlet for porportioning pressure therethrough within a predetermined pressure range, at least the one of said outlet passages having the one of said proportioner assembly means secured thereto directly at said outlet passage another end providing continuous hydraulic fluid communication for delivery of hydraulic fluid pressure from at least one of said pressurizing chambers through said at least one outlet passage and through said one proportioner assembly means and thus providing only one additional possible connection leak point in the circuitry served by one of said pressurizing chambers as compared to similar circuitry having no proportioner assembly therein, said one proportioner assembly means being removable and replaceable by use of a tool used on said outer surfaces for service when said housing is installed in said location as well as for interchangeability of a proportioner assembly means having different proportioning characteristics irrespective of installation of said housing in said location.

2. In a master cylinder assembly having an axially extending housing with an axially extending bore formed therein, a pair of hydraulic fluid pressurizing pistons in said bore and defining in conjunction with said bore first and second hydraulic fluid pressurizing chambers, first and second bosses integrally formed as part of said housing and extending transversely outward, a hydraulic fluid reservoir, inlet means connecting said reservoir to said bore to provide hydraulic fluid to said pressurizing chambers and to receive hydraulic fluid from said pressurizing chambers under certain conditions, and first and second outlet passage means formed in said housing and respectively extending through said first and second bosses and having first ends respectively communicating continuously with said first and second pressurizing chambers and second ends opening exteriorly of said housing bosses;

the improvement comprising:

said outlet passage means second ends being internally threaded;

first and second proportioner assembly means, each of said proportioner assembly means including a housing having a polygonal external cross section configuration and adapted to receive a drive tool such as a wrench, said housing having a bore extending therethrough providing an inlet and an outlet at opposite bore ends, said housing having an externally threaded inlet end containing said bore inlet, and pressure proportioning valve means in said proportioner housing bore intermediate said inlet and said outlet for proportioning pressure therethrough within a predetermined pressure range, said first and second outlet passage means respectively having said first and second proportioner assembly means threadably and sealingly secured thereto at said first and second outlet passage means second ends for delivery of hydraulic fluid pressure from said first and second pressurizing chambers through said first and second outlet passages means and through said first and second proportioner assembly means while providing only one additional possible connection leak point from each of said pressurizing chambers as compared to a similar master cylinder assembly having no proportioner assembly means, each of said first and second proportioner assembly means being removable and replaceable by use of a drive tool fitting said polygonal external cross section configuration for service as well as for replacement by a proportioner assembly means having different proportioning characteristics, said first and second bosses being so positioned circumferentially and axially on said housing as to permit access for removal and replacement of said proportioner assembly means with said master cylinder housing and reservoir in situ.

3. In a master cylinder assembly having a housing including a housing body with a bore formed therein and bosses extending laterally therefrom, a pair of hydraulic fluid pressurizing pistons in said bore and defining in conjunction with said bore first and second hydraulic fluid pressurizing chambers, a hydraulic fluid reservoir, inlet means connecting said reservoir to said bore to provide hydraulic fluid to said pressurizing chambers and to receive hydraulic fluid from said pressurizing chambers under certain conditions, and first and second outlet passage means formed in said housing through respective ones of said bosses and having first ends respectively communicating continuously with said first and second pressurizing chambers and second ends opening exteriorly of said housing through said bosses;

the improvement comprising:

said outlet passage means second ends being internally threaded;

first and second proportioner assembly means, each of said proportioner assembly means including a housing formed of bar stock having a polygonal perimeter and having a bore extending therethrough providing an inlet and an outlet at opposite bore ends, said housing having an externally threaded inlet end containing said bore inlet, and pressure proportioning valve means in said proportioner housing bore intermediate said inlet and said outlet for proportioning pressure therethrough within a predetermined pressure range, said first and second outlet passage means respectively having said first and second proportioner assembly means threadedly and sealingly secured thereto at said first and second outlet passage means second ends for delivery of hydraulic fluid pressure from said first and second pressurizing chambers through said first and second outlet passage means and through said first and second proportioner assembly means while providing only one additional possible connection leak point from each of said pressurizing chambers as compared to a similar master cylinder assembly having no proportioner assembly means, each of said first and second proportioner assembly means being removable and replaceable for service as well as for replacement by a proportioner assembly means having different proportioning characteristics, said removal and replacement being facilitated by use of a drive tool such as a wrench fitting said housing polygonal perimeter and said bosses being so positioned on said housing body as to permit full access to said proportioner assembly means when said master cylinder assembly is installed and connected for operation, and a second bore in said master cylinder housing having pressure failure warning switch operating means therein, said second bore having first and second closed opposite ends respectively in fluid communication with said first and second output passage means to provide hydraulic pressures from said first and second pressurizing chambers to said switch operating means.

4. In a master cylinder assembly having a housing including a housing body with a bore formed therein and bosses extending outwardly therefrom, a pair of hydraulic fluid pressurizing pistons in said bore and defining in conjunction with said bore first and second hydraulic fluid pressurizing chambers, a hydraulic fluid reservoir, inlet means connecting said reservoir to said bore to provide hydraulic fluid to said pressurizing chambers and to receive hydraulic fluid from said pressurizing chambers under certain conditions, and first and second outlet passage means formed in said housing through respective ones of said bosses and having first ends respectively communicating continuously with said first and second pressurizing chambers and second ends opening exteriorly of said housing through said respective ones of said bosses;

the improvement comprising:

said outlet passage means second ends being internally threaded;

first and second proportioner assembly means, each of said proportioner assembly means including a housing formed from hexagonal bar stock and having substantially the entire length thereof provided with a hexagonal outer surface, said housing also having a bore extending therethrough providing an inlet and an outlet at opposite bore ends, said housing having an externally threaded inlet end containing said bore inlet, and pressure proportioning valve means in said proportioner housing bore intermediate said inlet and said outlet for proportioning pressure therethrough within a predetermined pressure range, said first and second outlet passage means respectively having said first and second proportioner assembly means threadedly secured thereto at said first and second outlet passage means second ends for delivery of hydraulic fluid pressure from said first and second pressurizing chambers through said first and second outlet passage means and through said first and second proportioner assembly means while providing only one additional possible connection leak point from each of said pressurizing chambers as compared to a similar master cylinder assembly having no proportioner assembly means, each of said first and second proportioner assembly means being removable and replaceable for service as well as for replacement by a proportioner assembly means having different proportioning characteristics, said removal and replacement being facilitated by use of a wrench fitting said hexagonal outer surface and said respective ones of said bosses being so positioned on said housing body as to permit adequate operative access to said proportioner assembly means with said master cylinder assembly installed and connected for operation, said first and second passage means respectively having third ends opening exteriorly of said housing, said third ends being adapted to be connected to respectively provide hydraulic pressure from said first and second pressurizing chambers to one and the other of a pair of vehicle front wheel brakes, said first and second proportioner assembly means outlets being adapted to be connected to respectively provide hydraulic pressure from said first and second pressurizing chambers to one and the other of a pair of vehicle rear wheel brakes.

5. In a vehicle brake system having a pair of vehicle front brakes and a pair of vehicle rear brakes;

and a dual master cylinder assembly including a housing with a body having first and second pressurizing chambers, a pair of first brake actuating pressure outlets for said first pressurizing chamber, and a pair of second brake actuating pressure outlets for said second pressurizing chamber;

the improvement comprising:

first and second bosses formed as integral parts of said housing body and each having outer faces laterally spaced from said body and circumferentially spaced from each other, each of said outlets opening through one of said outer faces, a first brake pressure conduit connecting one of said pair of first outlets to one of said pair of vehicle front brakes, a second brake pressure conduit connecting one of said pair of second outlets to the other of said pair of vehicle front brakes, a first brake actuating pressure proportioning unit connected with the other of said pair of first outlets to extend perpendicularly from the one of said outer faces having the outlet connected therewith, and receiving brake actuating pressure from said first pressurizing chamber when said master cylinder assembly is actuated, a third brake pressure conduit connecting said first brake actuating pressure proportioning unit to one of said pair of vehicle rear brakes, a second brake actuating pressure proportioning unit connected with the other of said pair of second outlets to extend perpendicularly from the one of said outer faces having the outlet connected therewith, and receiving brake actuating pressure from said second pressurizing chamber when said master cylinder assembly is actuated, and a fourth brake pressure conduit connecting said second brake actuating pressure proportioning unit to the other of said pair of vehicle rear brakes, said one vehicle front brake being on the opposite vehicle side from said one vehicle rear brake, the points of connections made by said first brake pressure conduit and said first brake actuating pressure proportioning unit and said third brake pressure conduit being in one brake circuit served by said first pressurizing chamber and defining no more than five possible connection leak points in the one brake circuit, said proportioning units having hexagonal outer surfaces selectively receiving a tool for removal and replacement in situ.

* * * * *